United States Patent
Joisten-Pieritz et al.

(10) Patent No.: US 9,897,048 B2
(45) Date of Patent: Feb. 20, 2018

(54) INTERNAL COMBUSTION ENGINE INCLUDING AN EXHAUST GAS RECIRCULATION SYSTEM AND/OR A WATER-COOLED CHARGE AIR COOLER

(71) Applicant: DEUTZ Aktiengesellschaft, Cologne (DE)

(72) Inventors: Joachim Joisten-Pieritz, Kall (DE); Xenia Smolenzev, Cologne (DE); Peter Kipke, Olpe (DE); Toni Kleinschmidt, Bruehl (DE); Marco Jung, Cologne (DE); Tobias Kurt, Dormage (DE); Peter Hoffmann, Cologne (DE); Paul Schwabauer, Montabaur (DE); Gerhard Knaps, Troisdorf (DE); Ralf Blum, Aachen (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 15/080,128

(22) Filed: Mar. 24, 2016

(65) Prior Publication Data

US 2016/0281649 A1  Sep. 29, 2016

(30) Foreign Application Priority Data

Mar. 27, 2015  (DE) ......................... 10 2015 003 908

(51) Int. Cl.

| F01P 3/04 | (2006.01) |
|---|---|
| F01P 3/18 | (2006.01) |
| F02M 26/32 | (2016.01) |
| F02B 29/04 | (2006.01) |
| F02M 26/30 | (2016.01) |

(Continued)

(52) U.S. Cl.
CPC .............. *F02M 26/32* (2016.02); *F01P 3/04* (2013.01); *F01P 3/18* (2013.01); *F02B 29/0475* (2013.01); *F02M 26/20* (2016.02); *F02M 26/28* (2016.02); *F02M 26/30* (2016.02); *F01M 2011/0025* (2013.01); *F01P 2003/182* (2013.01); *F01P 2060/16* (2013.01); *F02F 1/10* (2013.01); *F02F 7/00* (2013.01); *Y02T 10/146* (2013.01)

(58) Field of Classification Search
CPC ........ F02M 26/32; F02M 26/20; F02M 26/28; F02M 26/30; F01P 3/04; F01P 3/18
USPC .................. 123/568.12, 568.13; 701/108
See application file for complete search history.

(56) References Cited

U.S. PATENT DOCUMENTS

| 6,360,702 B1 * | 3/2002 | Osada .................. F28D 7/0066 123/196 AB |
| 2008/0257317 A1 * | 10/2008 | Cerabone ................. F01P 3/12 123/568.12 |
| 2010/0170482 A1 * | 7/2010 | Feist ................ F02M 35/10157 123/568.12 |

FOREIGN PATENT DOCUMENTS

| AT | 501798 | 11/2006 |
| DE | 691 30 976 T2 | 7/1999 |

(Continued)

*Primary Examiner* — Mahmoud Gimie
(74) *Attorney, Agent, or Firm* — Davidson, Davidson & Kappel, LLC

(57) ABSTRACT

An internal combustion engine having a crankcase and a cylinder head is provided. The internal combustion engine includes at least one cylinder block, at least one cooler, at least one smooth flange surface for accommodating the at least one cooler, at least one coolant inlet to the cooler, at least one coolant outlet from the cooler, at least one exhaust (Continued)

gas inlet to the cooler, at least one integrated exhaust gas feed-through from the cooler and at least one internal cooling section.

16 Claims, 8 Drawing Sheets

(51) Int. Cl.
*F02M 26/20* (2016.01)
*F02M 26/28* (2016.01)
*F02F 7/00* (2006.01)
*F01M 11/00* (2006.01)
*F02F 1/10* (2006.01)

(56) References Cited

FOREIGN PATENT DOCUMENTS

| | | |
|---|---|---|
| DE | 10119484 | 10/2002 |
| DE | 102004023540 | 12/2005 |
| DE | 102010009061 | 8/2011 |
| DE | 202013102941 | 9/2013 |
| EP | 0489263 | 6/1992 |
| EP | 1099847 | 5/2001 |

* cited by examiner

INTERNAL COMBUSTION ENGINE INCLUDING AN EXHAUST GAS RECIRCULATION SYSTEM AND/OR A WATER-COOLED CHARGE AIR COOLER

This claims the benefit of German Patent Application DE102015003908.3, filed Mar. 27, 2015 and hereby incorporated by reference herein.

The present invention relates to an internal combustion engine, which includes an exhaust gas recirculation (EGR) system and/or a water-cooled charge air cooler.

BACKGROUND

An internal combustion engine of this type is known from DE 691 30 976 T2. This internal combustion engine includes an exhaust gas recirculation system with a distribution line which runs in parallel to a fresh gas line. The fresh gas line has branching fresh gas channels, which each lead to two inlet valves of a cylinder unit. The distribution line, including individual feed lines, opens into the fresh gas channels.

The object of the present invention is to improve the mounting of the exhaust gas recirculation device, in particular the distribution line, onto the internal combustion engine.

It is advantageous that the internal combustion engine has an extremely compact construction, and that the heat transfer may take place extremely effectively without unnecessary tubing.

In one refinement of the present invention, it is provided that the cooling section includes turbulence generators, which ensure an even better heat transfer.

In another embodiment of the present invention, diaphragms and/or throttle devices are inserted into the channels. An individual adaptation of the exhaust gas quantity supplied to the individual cylinder units may take place with the aid of these components.

BRIEF DESCRIPTION OF THE DRAWINGS

Other advantageous embodiments of the present invention are apparent from the description of the drawings, which describes in greater detail the exemplary embodiments of the present invention illustrated in the figures.

DETAILED DESCRIPTION

Figure 1:
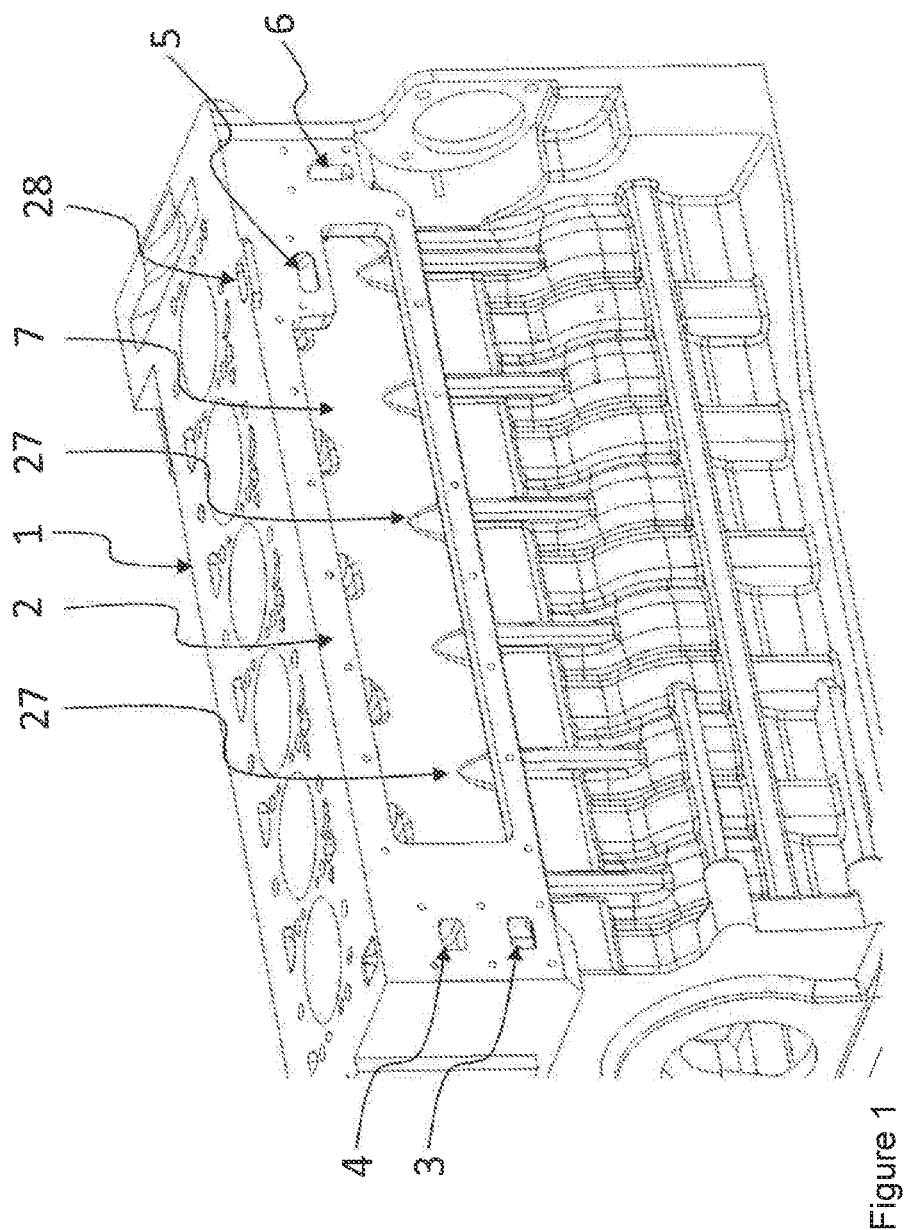
FIG. 1 shows a perspective view of a crankcase, including a cooling housing of an exhaust gas cooler of an exhaust gas recirculation device integrated into the crankcase.

FIG. 1 shows cylinder block 1 of the crankcase of the internal combustion engine, which has a smooth flange surface 2 on its longitudinal side. A coolant inlet opening 3, which allows coolant to pass through to EGR/WCAC cooler 13, is provided in the sealing plane of smooth flange surface 2, in the area of a front side of the internal combustion engine. Coolant outlet opening 4 of cooler 13 is also situated in the sealing plane of flange surface 2, in the direct vicinity of coolant inlet opening 3. An exhaust gas inlet to the cooler, which allows exhaust gases to pass through to cooler 13, is provided in the sealing plane of smooth flange surface 2, in the area of the other front side of the internal combustion engine. The integrated exhaust gas feed-through from the cooler is also situated in the sealing plane of flange surface 2, in the direct vicinity of the exhaust gas inlet to cooler 13. Internal cooling section 7 has tab-like elevations 27, which, when interacting with flow guiding elements situated on cooler housing 12, 13, ensure a turbulent flow of the coolant flowing around or between the tab-like elevations 27 and the flow guiding elements.

Figure 2:
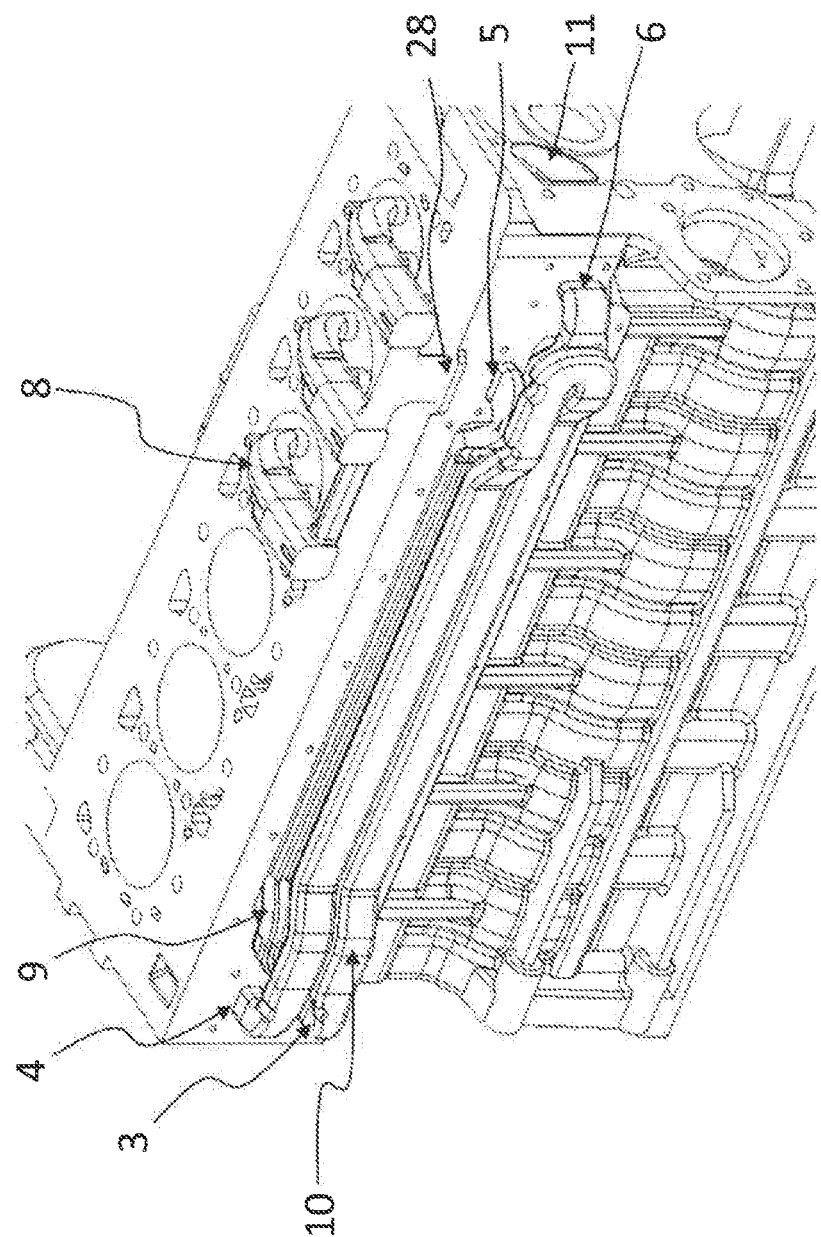
FIG. 2 shows a schematic representation of the crankcase according to FIG. 1 and its media flows.

FIG. 2 shows cylinder block 1 of the crankcase of the internal combustion engine. Crankcase 1 has a smooth flange surface 2 on its longitudinal side. A coolant inlet opening 3, which allows coolant to pass through to cooler 13, is provided in the sealing plane of smooth flange surface 2, in the area of a front side of the internal combustion engine. Coolant outlet opening 4 of cooler 13 is also situated in the sealing plane of flange surface 2, in the direct vicinity of coolant inlet opening 3. The coolant enters the area of line guide 10 of the coolant in cooler 13 via coolant inlet opening 3, absorbs the heat of the exhaust gas and leaves the cooler via coolant outlet opening 4. An exhaust gas inlet 5 to cooler 13, which allows the exhaust gases to pass through to cooler 13, is provided in the sealing plane of smooth flange surface 2, in the area of the other front side of the internal combustion engine. The integrated exhaust gas feed-through from cooler 13, through which the exhaust gas leaves cooler 13 again, is also situated in the sealing plane of flange surface 2, in the direct vicinity of the exhaust gas inlet to cooler 13. Internal cooling section 7 has tab-like elevations, which, when interacting with flow guiding elements situated on cooler housing 12, 13, ensure a turbulent flow and thus a better heat transfer of the coolant flowing around or between the tab-like elevations and the flow guiding elements, with the aid of cooler 12, 13. The gas is removed from the cylinder head via channel guide 8 in the cylinder head and is passed on to exhaust gas inlet 5 via exhaust gas inlet opening 28 with the aid of a channel connection in crankcase 1. The exhaust gas which reaches exhaust gas inlet 5 is introduced into line guide EGR in cooler 9 and transfers its waste heat to the coolant in cooler 13. The cooled exhaust gas subsequently leaves cooler 13 via integrated exhaust gas feed-through 6 through crankcase 1 in the direction of the exhaust system.

Figure 3:
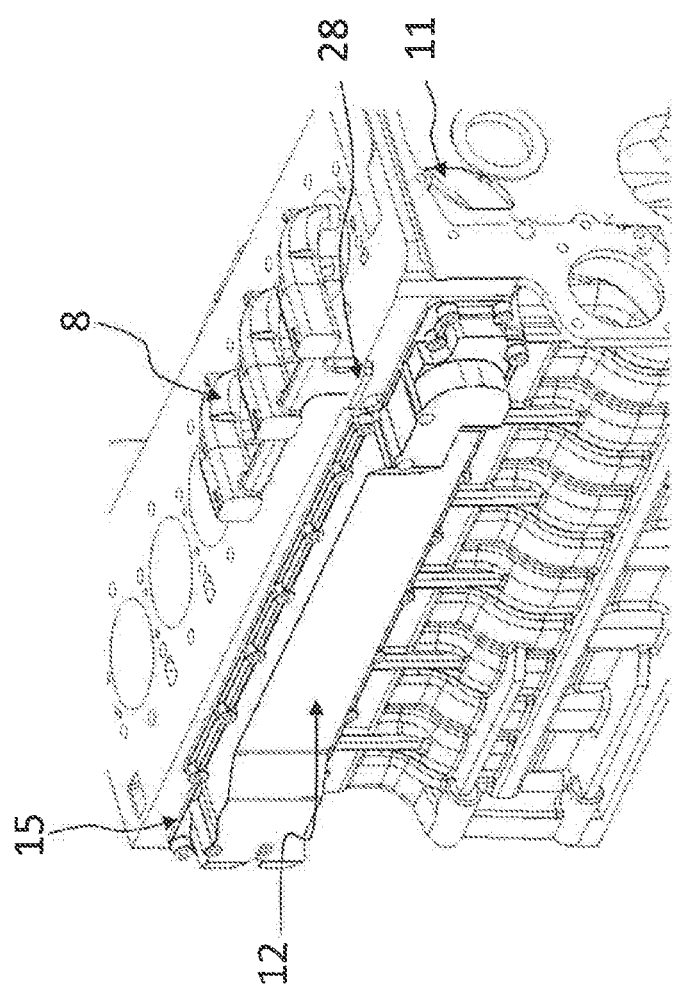
FIG. 3 shows a view of the crankcase from FIG. 2, including an EGR cooling housing, whose base body is part of the crankcase, the base body being covered by a cover.

FIG. 3 shows cylinder block 1 of the crankcase of the internal combustion engine. Crankcase 1 has an EGR/water cooled air conditioner (WCAC) interface in the form of a smooth flange surface 2 on its longitudinal side. A coolant inlet opening 3, which is covered by EGR cooler 12 and allows coolant to pass through to EGR cooler 12, is provided in the sealing plane of smooth flange surface 2, in the area of a front side of the internal combustion engine. Coolant outlet opening 4 of EGR cooler 12, which is also covered, is also situated in the sealing plane of flange surface 2, in the direct vicinity of coolant inlet opening 3. The coolant enters the area of line guide 10 of the coolant in cooler 12 via coolant inlet opening 3, absorbs the heat of the exhaust gas and leaves the cooler via coolant outlet opening 4. An exhaust gas inlet 5 to EGR cooler 12, which is also covered and allows the exhaust gases to pass through to cooler 12, is provided in the sealing plane of smooth flange surface 2, in the area of the other front side of the internal combustion engine. The integrated exhaust gas feed-through from cooler 12, through which the exhaust gas leaves cooler 12 again, is also situated in the sealing plane of flange surface 2, in the direct vicinity of the exhaust gas inlet to cooler 12. Covered internal cooling section 7 has tab-like elevations, which, when interacting with flow guiding elements situated internally at cooler housing 12, ensure a turbulent flow and thus a better heat transfer of the coolant flowing around or between the tab-like elevations and the flow guiding elements, with the aid of cooler 12. The gas is removed from the cylinder head via channel guide 8 in the cylinder head and is passed on to exhaust gas inlet 5 via exhaust gas inlet opening 28 with the aid of a channel connection in crankcase 1. The exhaust gas which reaches exhaust gas inlet 5 is introduced into line guide EGR in cooler 9 and transfers its waste heat to the coolant in cooler 12. The cooled exhaust gas subsequently leaves cooler 12 via integrated exhaust gas feed-through 6 through crankcase 1 in the direction of the exhaust system, with the aid of integrated line guide 11 to the inlet side. A seal 15 is situated between EGR cooler 12 and flange surface 2.

Figure 4:
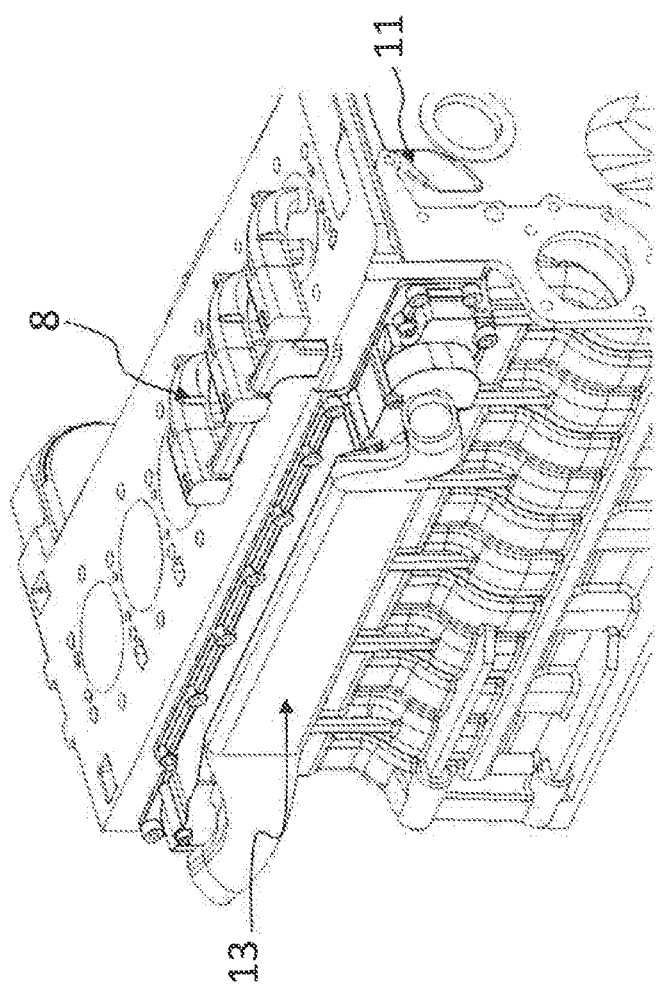
FIG. 4 shows a view of the crankcase from FIG. 2, including an EGR and water-cooled charge air cooling housing, whose base body is part of the crankcase, the base body being covered by a cover.

FIG. 4 shows a view of the crankcase from FIG. 2, including an EGR and a water-cooled charge air cooling housing 13, whose base body is part of the crankcase, the base body being covered by a cover.

Cylinder block 1 of the crankcase of the internal combustion engine is screwed to exhaust gas recirculation (EGR) and a water-cooled charge air cooler housing 13 on its longitudinal sides. Crankcase 1 has a smooth flange surface 2 on its longitudinal side. A coolant inlet opening 3, which allows coolant to pass through to cooler 13, is provided in the sealing plane of smooth flange surface 2, in the area of a front side of the internal combustion engine. Coolant outlet opening 4 of cooler 13 is also situated in the sealing plane of flange surface 2, in the direct vicinity of coolant inlet opening 3. The coolant enters the area of line guide 10 of the coolant in cooler 13 via coolant inlet opening 3, absorbs the heat of the exhaust gas and leaves the cooler via coolant outlet opening 4. An exhaust gas inlet 5 to cooler 13, which allows the exhaust gases to pass through to cooler 13, is provided in the sealing plane of smooth flange surface 2, in the area of the other front side of the internal combustion engine. The integrated exhaust gas feed-through from cooler 13, through which the exhaust gas leaves cooler 13 again, is also situated in the sealing plane of flange surface 2, in the direct vicinity of the exhaust gas inlet to cooler 13. Internal cooling section 7 has tab-like elevations, which, when interacting with flow guiding elements situated on cooler housing 12, 13, ensure a turbulent flow and thus a better heat transfer of the coolant flowing around or between the tab-like elevations and the flow guiding elements, with the aid of cooler 12, 13. The gas is removed from the cylinder head via channel guide 8 in the cylinder head and is passed on to exhaust gas inlet 5 via exhaust gas inlet opening 28 with the aid of a channel connection in crankcase 1. The exhaust gas which reaches exhaust gas inlet 5 is introduced into line guide EGR in cooler 9 and transfers its waste heat to the coolant in cooler 13. The cooled exhaust gas subsequently leaves cooler 13 via integrated exhaust gas feed-through 6 through crankcase 1 in the direction of the exhaust system, with the aid of integrated line guide 11, exhaust gas channels which are cast into crankcase 1.

Figure 5:
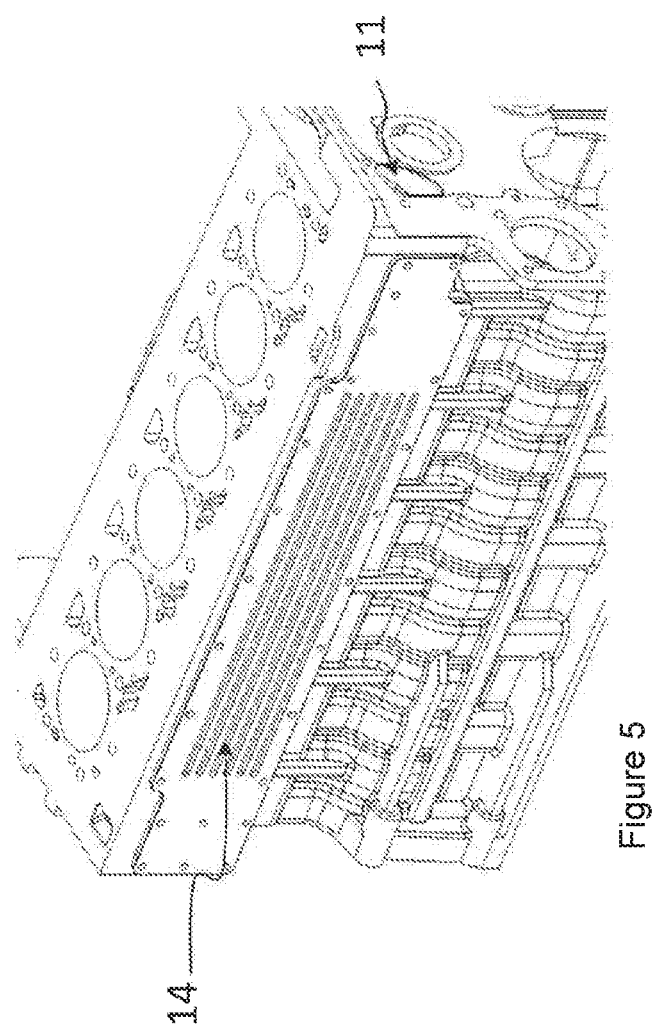
FIG. 5 shows a view of the crankcase from FIG. 2, including a heat protection cover.

FIG. 5 shows a view of the crankcase from FIG. 2, including a heat protection cover 14, which is screwed on in the area of flange surface 2 and radiates heat supplied with the aid of the cooling water.

Figure 6:
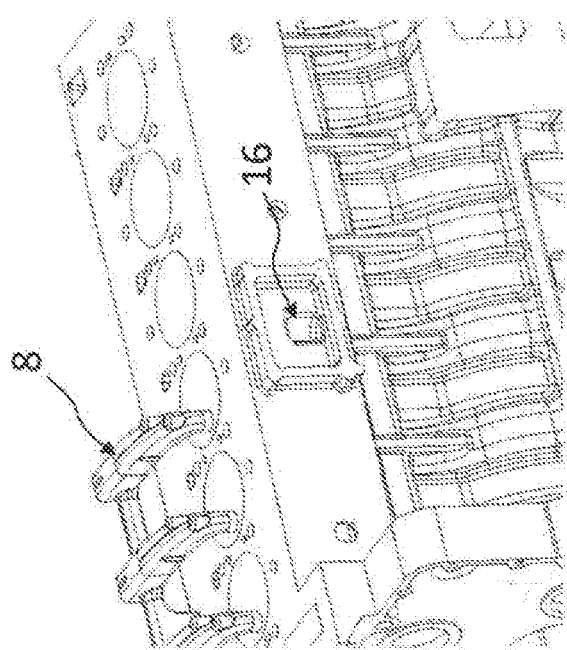
FIG. 6 shows a view of the channel to the mixing and control unit.
Figure 7:
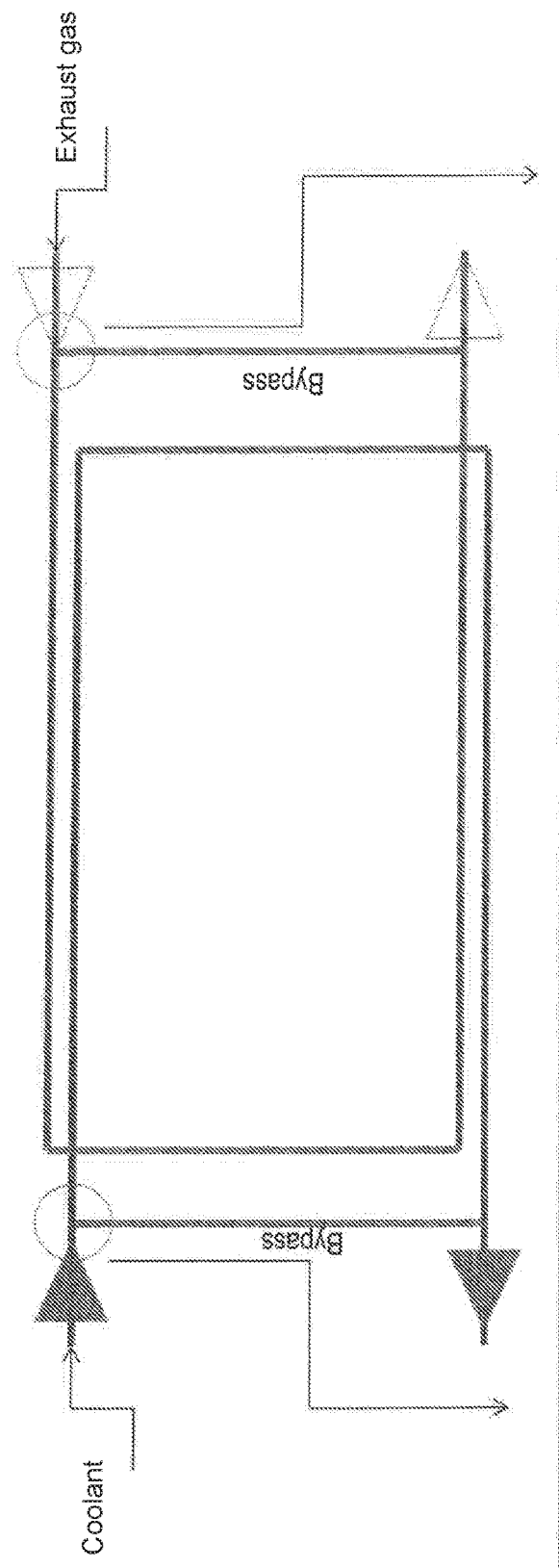
FIG. 7 shows a schematic representation of the control of the exhaust gas and coolant flows.
Figure 7:
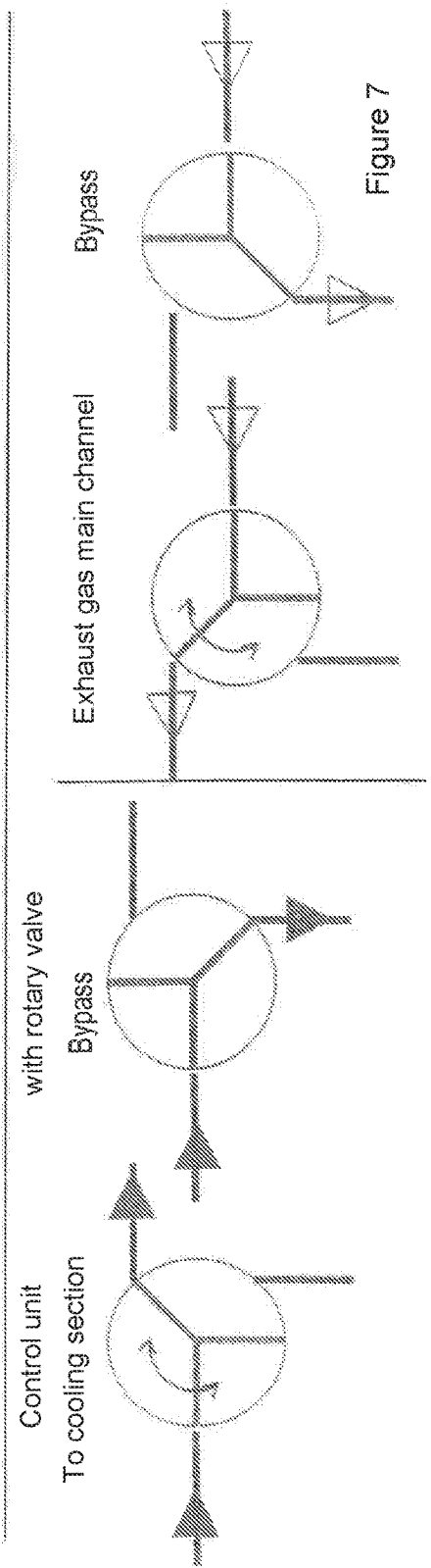

FIG. 6 shows a view of the channel to mixing and control unit 16, which is situated on the longitudinal side of crankcase 1 opposite flange surface 2, and which supports the control or regulation of the media flows illustrated in FIG. 7.

FIG. 7 shows a schematic representation of the regulation of the exhaust gas and coolant flows of the internal combustion engine.

Figure 8:
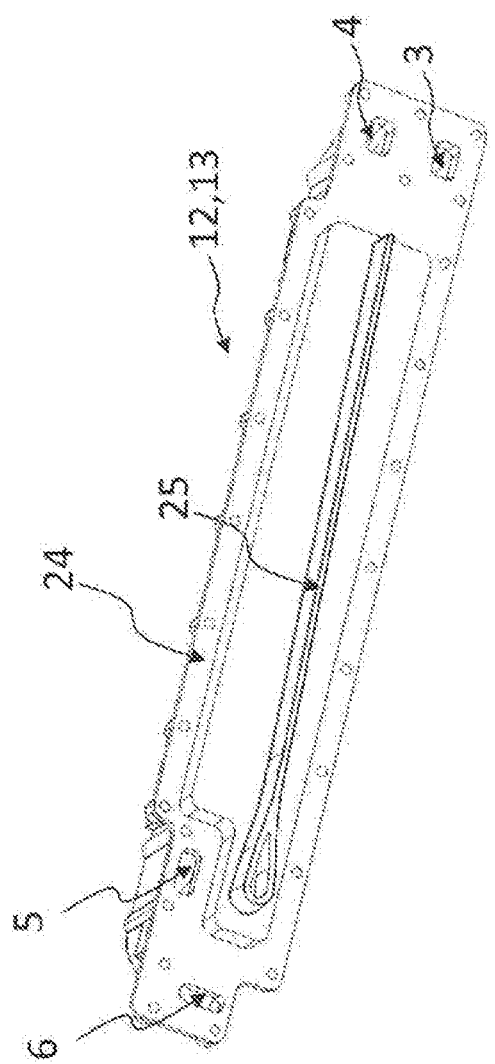
FIG. 8 shows a view of the cooler.

FIG. 8 shows cooler 12, 13. A flow guiding element 25, which has already been described above, is situated on the inside of cooler 12, 13 surrounded by a flange 24.

1 cylinder block
2 EGR/WCAC interface (smooth flange surface)
3 coolant inlet to the cooler (controllable)
4 coolant outlet from the cooler
5 exhaust gas inlet to the cooler (controllable)
6 integrated exhaust gas feed-through from the cooler
7 internal cooling section
8 gas removal from the cylinder head
9 EGR line guide in the cooler
10 coolant line guide in the cooler
11 integrated line guide to the inlet side
12 with EGR cooler
13 with EGR/WCAC cooler
14 cover/heat protection
15 seal
16 channel to mixing and control unit
24 flange
25 flow guiding element
27 tab-like elevations
28 exhaust gas inlet opening

What is claimed is:

1. An internal combustion engine having a crankcase and a cylinder head, the internal combustion engine comprising:
   at least one cylinder block;
   at least one cooler;
   at least one smooth flange surface for accommodating the at least one cooler;
   at least one coolant inlet to the cooler;
   at least one coolant outlet from the cooler;
   at least one exhaust gas inlet to the cooler;
   at least one integrated exhaust gas feed-through from the cooler; and
   at least one internal cooling section, the coolant inlet and the coolant outlet both being on a first side of the internal cooling section such that coolant from the coolant inlet flows in the cooler in a first direction along the internal cooling section and then flows in the cooler in a second direction opposite the first direction along the internal cooling section and out the coolant outlet.

2. The internal combustion engine as recited in claim 1 wherein the internal cooling section includes turbulence generators.

3. The internal combustion engine as recited in claim 1 wherein the coolant inlet to the cooler has a controllable design.

4. The internal combustion engine as recited in claim 1 wherein the exhaust gas inlet to the cooler has a controllable design.

5. The internal combustion engine as recited in claim 1 wherein the smooth flange surface is situated on a longitudinal side of the crankcase.

6. The internal combustion engine as recited in claim 5 wherein the smooth flange surface is an exhaust gas recirculation/water cooled air conditioner interface.

7. The internal combustion engine as recited in claim 1 wherein the smooth flange surface is situated on a longitudinal side of the cylinder head.

8. The internal combustion engine as recited in claim 7 wherein the smooth flange surface is an exhaust gas recirculation/water cooled air conditioner interface.

9. The internal combustion engine as recited in claim 1 further comprising channels and diaphragms and/or throttle devices inserted into the channels.

10. The internal combustion engine as recited in claim 1 further comprising an exhaust gas recirculation/water cooled air conditioner cooler connected to the internal cooling section in a communicating manner.

11. A method for operating an internal combustion engine comprising:
 operating the internal combustion engine as reciting in claim 1.

12. The internal combustion engine as recited in claim 1 further comprising an exhaust gas recirculation line connected to the exhaust gas inlet and the integrated exhaust gas feed-through.

13. The internal combustion engine as recited in claim 12 wherein the exhaust gas inlet is on a second side of the internal cooling section opposite the first side.

14. The internal combustion engine as recited in claim 13 further comprising an exhaust gas recirculation line connected to the exhaust gas inlet and the integrated exhaust gas feed-through, the integrated exhaust gas feed-through being on the second side of the internal cooling section such that exhaust gas from the exhaust gas inlet flows in the exhaust gas recirculation line in the second direction along the internal cooling section and then flows in the exhaust gas recirculation line in the first direction along the internal cooling section and out the coolant outlet integrated exhaust gas feed-through.

15. The internal combustion engine as recited in claim 12 wherein the cooler extends further away from the smooth flange surface than the exhaust gas recirculation line such that the exhaust gas recirculation line flows inside of the cooler.

16. The internal combustion engine as recited in claim 12 further comprising a further surface, a channel guide configured for removing exhaust gas from the cylinder head and an exhaust gas inlet opening in the further surface, the exhaust gas being passed through the exhaust gas inlet opening to the exhaust gas inlet.

\* \* \* \* \*